United States Patent [19]

St. Clair

[11] 4,193,093
[45] Mar. 11, 1980

[54] CCD CAMERA INTERFACE CIRCUIT

[75] Inventor: Richard C. St. Clair, Ridgecrest, Calif.

[73] Assignee: The United States of America as represented by the Secretary of the Navy, Washington, D.C.

[21] Appl. No.: 930,835

[22] Filed: Aug. 3, 1978

[51] Int. Cl.² .................. H04N 5/14; H04N 5/21; H04N 3/14; H04N 5/34

[52] U.S. Cl. ................................... 358/160; 358/167; 358/213; 358/163

[58] Field of Search ............... 358/163, 167, 213, 241, 358/160; 357/30; 315/169.2, 169.3; 250/211 R, 211 J, 578; 360/38

[56] References Cited

U.S. PATENT DOCUMENTS

| | | | |
|---|---|---|---|
| 2,965,711 | 12/1960 | James et al. | 358/163 |
| 3,309,460 | 3/1967 | Rank | 360/38 X |
| 3,428,762 | 2/1969 | Geddes et al. | 360/38 |
| 3,869,567 | 3/1975 | Covington | 358/163 |
| 3,904,818 | 9/1975 | Kovac | 358/213 X |
| 3,919,471 | 11/1975 | Spiessbach et al. | 358/163 |

Primary Examiner—Robert L. Griffin
Assistant Examiner—Aristotelis M. Psitos
Attorney, Agent, or Firm—R. S. Sciascia; W. Thom Skeer

[57] ABSTRACT

This invention pertains to blemish compensation circuits and particularly to blemish compensation circuits for Charge Coupled Device cameras.

9 Claims, 2 Drawing Figures

CCD CAMERA INTERFACE CIRCUIT

BACKGROUND OF THE INVENTION

This invention lies in the field of video apparatus. More particularly, it concerns apparatus for use with a Charge Coupled Device video camera which has at least one blemish in its photosensitive surface.

The recent development of a Charge Coupled Device (CDD) camera having standard television resolution capability has led to use in applications formerly filed by orthocon or vidicon tubes. The CCD camera is basically a sampled-data system using discreet silicon cells to sample a video scene. Due to the high density of cells on the chip and limitations on the state of the art for fabricating chips, a certain minimum amount of cells will be defective. A defective cell appears as a saturated video point when displayed on a television monitor. For many uses the saturated video point must be removed.

A similar problem can arise in prior art camera systems when there is a flaw in the photosensitive surface. In addition, camera tubes produce a form of distortion called shading distortion which is not present in CCD cameras. Prior approaches often combined shading and spot distortion correction as in U.S. Pat. No. 2,445,040. Shading distortion is conventionally corrected by a series of oscillators which produce signal to cancel tube distortion as in U.S. Pat. No. 2,658,104. As a CCD camera has no shading distortion such circuits fulfill no purpose as they do not correct for defective cells.

Prior art blemish correction as applied to tube cameras required a pre-programming of the location of the defective spot as in U.S. Pat. No. 3,864,567. Alternatively, a mask can be used for this purpose as in U.S. Pat. No. 2,445,040. Systems that automatically correct for flaws have not been developed because the shading distortion of tube circuits would activate the blemish correction circuit and distort the picture.

Heretofore there has been shown no way for automatically correcting for a defective cell on a CCD camera.

SUMMARY OF THE INVENTION

Accordingly, the present invention corrects for defective cells in CCD cameras without the necessity of pre-programming. The invention establishes a threshold signal from the maximum video value. The incoming signal is compared with the threshold signal. If the video signal is within normal parameters, it passes through the invention unchanged. The signal from a defective cell activates a switch which prevents the video signal from passing. A sampled signal is substitued for the signal from the defective cell. A delay means delays the video signal while processing is taking place.

DESCRIPTION OF THE PREFERRED EMBODIMENT

Figure 1:
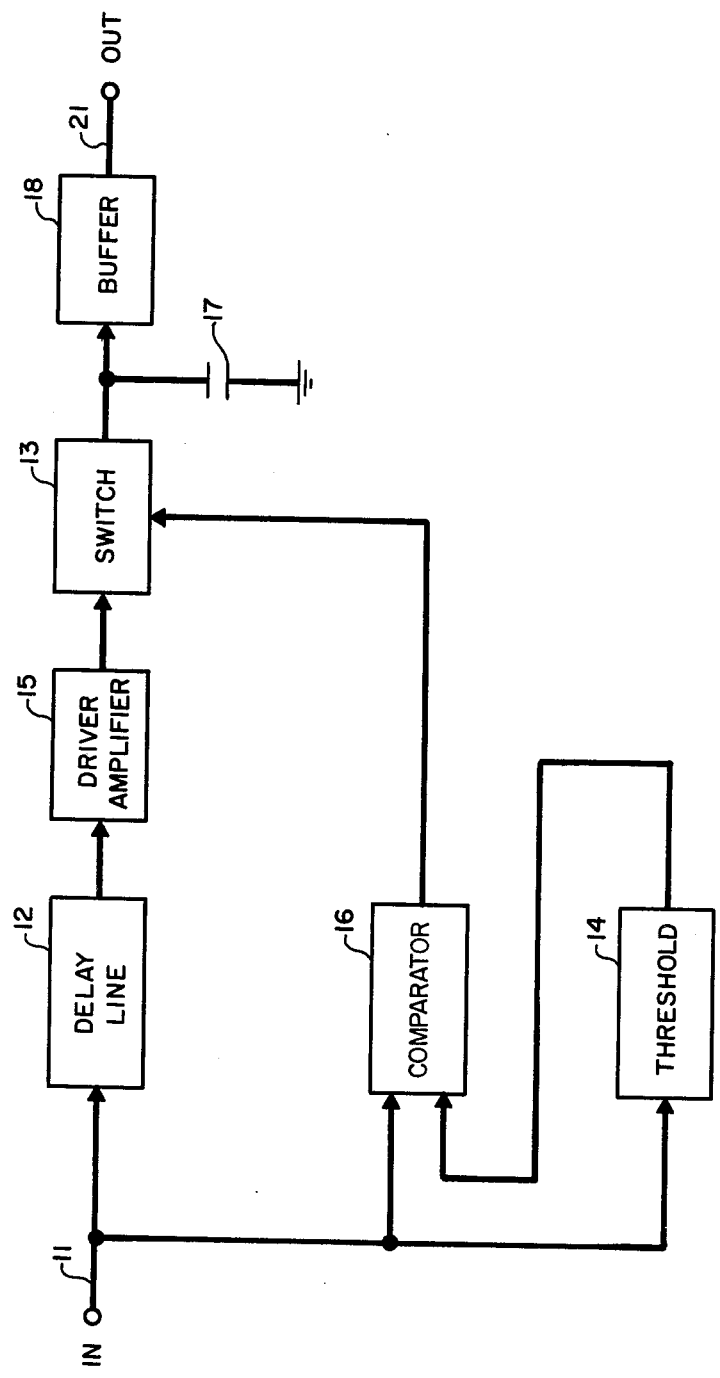
FIG. 1 is a block diagram of the circuit.

FIG. 1 is a block diagram of the circuit. The camera video enters the circuit input terminal 11. The video is passed through a delay line 12 to allow for propagation delay times in a comparator 16 and an electronic switching circuit 13 which has a signal input terminal, an activator input terminal, and an output terminal. A driver amplifier 15 is connected between delay line 12 and switch 13. The function of driver amplifier 15 is to provide high current drive capability through switch 13, which is normally closed, to a sampling capacitor 17. This drive capability is required in order to maximize the value of sampling capacitor 17 without degrading the bandwidth. A buffer amplifier 18 presents a very high load impedance to capacitor 17.

An adaptive threshold circuit 14 which is a peak detector which responds to the maximum video background value. Threshold circuit 14 is adjusted so that comparator 16 produces an output signal in response only to saturated video such as that produced by defective cells. The leading edge of the defective cell signal propagates through comparator 16 and opens switch 13 before the signal has passed through delay 12 and arrived at capacitor 17. When switch 13 is open a video output terminal 21 provides an output which will be the value stored on capacitor 17,.

When comparator 16 detects the trailing edge of the saturated video, a signal is applied to the activator input of switch 13 which is held open until after the trailing edge has passed through delay 12, after which normal video is allowed to pass through the circuit.

Figure 2:
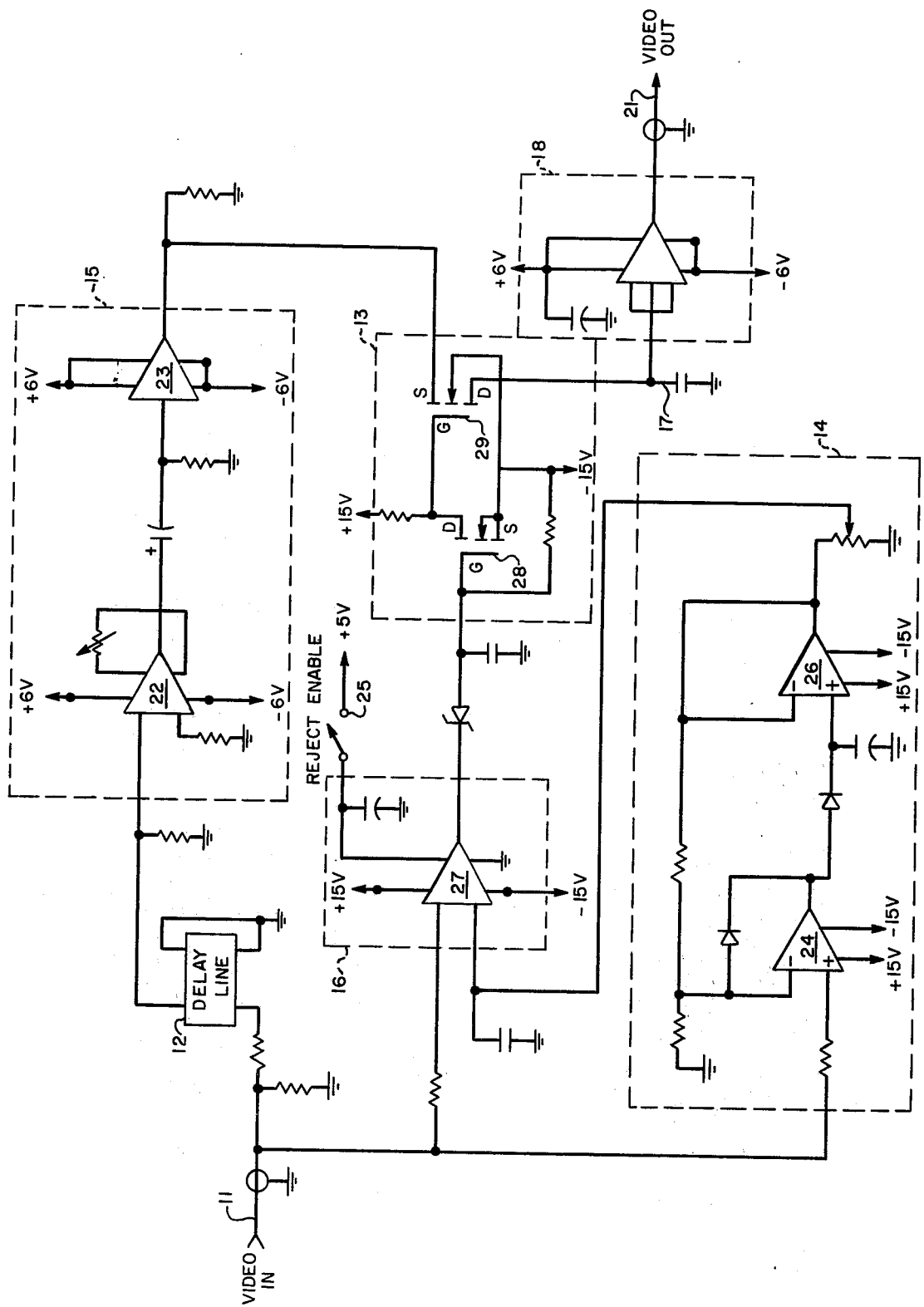
FIG. 2 is the schematic of a working embodiment of the circuit.

FIG. 2 shows a circuit which accomplishes the purpose of the invention. Conventional elements are used in the circuit, and other conventional elements could be substituted.

The delay is provided by delay line 12. A PE9825 video delay line has been used successfully in the working embodiment but other equivalent methods of delay could be used.

Driver amplifier 15 uses conventional amplifiers 22 and 23. The amplifiers used were SE592K and LH0002. Other amplifiers that provide suitable gain and bandwidth could be used. A one step amplifier using a single LH0002 has been successfully used also.

Switch 13 used two 'n' channel MOSFET'S 28 and 29. The drain of MOSFET 28 is connected directly to the gate of MOSFET 29. The switch is triggered by a signal on the gate of MOSFET 28, which causes MOSFET 29 to switch off the signal passing between the source and drain of MOSFET 29. In a working model of the invention MOSFET 28 was an SD211 and MOSFET 29 was an SD215, but any similar MOSFET'S could be used. Likewise, an equivalent switching apparatus that can function at video speeds could be substituted.

Adaptive threshold 14 is provided by two operational amplifiers 24 and 26 which are connected to input 11. The threshold 14 functions as a peak detector. 741's were used as operational amplifiers in the embodiment shown.

Comparator 16 uses a differential amplifier 27 to compare the signal from input 11 and threshold 14. An SE527K was used, but equivalent differential amplifiers could be substituted. The operation of the circuit is controlled by switch 25.

Buffer 18 effectively isolates switch 13 from output 21. In addition it provides a high impedance to sampling capacitor 17. A conventional arrangement is used for the buffer. An LH0033 was used in the working model for the amplifier.

For the embodiment shown a suitable value of capacitor 17 was 681 pf. For different compounds a different value may be required.

It will be apparent that the embodiment shown is only exemplary and that various modifications in construction and arrangement may be made without departing from the scope of the invention as defined in the appended claims.

What is claimed is:

1. A charge coupled device video camera interface circuit having a circuit input terminal and a video output terminal, comprising:

delay means connected to said circuit input for delaying a signal applied thereto;

a driver amplifier connected to said delay means for amplifying a signal received therefrom;

an adaptive threshold circuit connected to said circuit input;

a comparator having first and second inputs, said first input of said comparator connected to said circuit input, said second input of said comparator connected to said threshold circuit said comparator configured to produce an output signal when the signal applied to said first input of said comparator exceeds the signal applied to said second input of said comparator by a predetermined amount;

a switch having a signal input terminal, an activator input terminal, and an output terminal, said signal input terminal connected to said driver amplifier to receive a signal therefrom, said activator input terminal connected to the output of said comparator, said switch configured to open when said switch receives a signal from said comparator a buffer amplifier connected to the output of said switch;

signal storage means for storing signals connected to the output terminal of said switch and to said buffer amplifier such that when said switch to said buffer amplifier connected such that when said switch is opened, a stored signal is applied to said buffer amplifier.

a buffer amplifier connected to the output of said switch.

2. A charge coupled device video camera interface circuit as in claim 1 wherein said delay means is a delay line.

3. A charge coupled device video camera interface circuit as in claim 2 wherein said switch is an electronic switching circuit.

4. A charge coupled device video camera interface circuit as in claim 3 wherein said signal storage means is a capacitor.

5. A charge coupled device video camera interface circuit according to claim 4 wherein said adaptive threshold circuit comprises two operational amplifiers.

6. A charge coupled device video camera interface circuit according to claim 5 wherein said comparator comprises a differential amplifier.

7. A charge coupled device video camera interface circuit according to claim 1 wherein said switch comprises an electronic switching circuit.

8. A charge coupled device video camera interface circuit according to claim 1 wherein said adaptive threshold circuit comprises two operational amplifiers.

9. A charge coupled device video camera interface circuit according to claim 1 wherein said comparator comprises a differential amplifier.

* * * * *